United States Patent
Minato et al.

(10) Patent No.: US 8,663,375 B2
(45) Date of Patent: Mar. 4, 2014

(54) OIL SUPPRESSING STRUCTURE IN AIR DRYING DEVICE

(75) Inventors: Ichiro Minato, Yokosuka (JP); Hiroyuki Murakami, Yokosuka (JP); Hiroki Hasebe, Yokosuka (JP); Takeo Shimomura, Yokosuka (JP); Takuya Sugio, Yokosuka (JP)

(73) Assignee: Nabtesco Automotive Corporation, Tokyo (JP)

( * ) Notice: Subject to any disclaimer, the term of this patent is extended or adjusted under 35 U.S.C. 154(b) by 0 days.

(21) Appl. No.: 13/144,383

(22) PCT Filed: Jan. 14, 2010

(86) PCT No.: PCT/JP2010/050361
§ 371 (c)(1),
(2), (4) Date: Sep. 7, 2011

(87) PCT Pub. No.: WO2010/082610
PCT Pub. Date: Jul. 22, 2010

(65) Prior Publication Data
US 2011/0308393 A1   Dec. 22, 2011

(30) Foreign Application Priority Data

Jan. 14, 2009 (JP) ............... P.2009-005398
Jul. 29, 2009 (JP) ............... P.2009-175989

(51) Int. Cl.
*B01D 53/02* (2006.01)
(52) U.S. Cl.
USPC ............ 96/134; 96/135; 96/136; 96/137; 95/118; 95/143; 55/385.3; 55/DIG. 17
(58) Field of Classification Search
USPC ............ 96/134–137; 95/118, 143; 55/385.3; 55/DIG. 17
See application file for complete search history.

(56) References Cited

U.S. PATENT DOCUMENTS

| 4,572,725 | A | * | 2/1986 | Kojima ............... 96/137 |
| 4,999,035 | A | * | 3/1991 | Warndorf ............ 96/117.5 |
| 6,238,464 | B1 | | 5/2001 | Dullien |
| 6,484,413 | B1 | | 11/2002 | Larsson |
| 6,558,457 | B1 | | 5/2003 | Kolczyk |

(Continued)

FOREIGN PATENT DOCUMENTS

DE   102005057630 A1   6/2007
EP      0601196 A1     6/1994

(Continued)

OTHER PUBLICATIONS

Translation of DE 10 2005 057 630 A1 (Mahle Int GmbH) Jun. 6, 2007.*

(Continued)

*Primary Examiner* — Christopher P Jones
(74) *Attorney, Agent, or Firm* — Panitch Schwarze Belisario & Nadel LLP

(57) ABSTRACT

An oil suppressing structure in an air drying device for removing oil which rises in an interior of the air drying device used in a vehicle compressed air brake system includes an outer case 21, a drying case 22 in an interior of the outer case 21, a base plate 23 fixed to a lower end portion 21a of the outer case 21, and an outer cover 24 fixed to a lower end portion 21a of the base plate 23. The drying case 22 has a large-diameter long cylindrical body portion 22A and a small-diameter long cylindrical body portion 22B. A particulate desiccating agent 25 is filled in an interior of the large-diameter cylindrical body portion 22A. An oil adsorbing material 27 is inserted in a space S3 between an inner wall of the outer case 21 and the small-diameter long cylindrical body portion 22B of the drying case 22.

3 Claims, 10 Drawing Sheets

(56) References Cited

U.S. PATENT DOCUMENTS

| | | | |
|---|---|---|---|
| 6,730,143 B1 * | 5/2004 | Nichols et al. | 95/118 |
| 6,786,953 B2 * | 9/2004 | Fornof et al. | 95/122 |
| 6,878,194 B2 * | 4/2005 | Hoffman et al. | 96/147 |
| 6,951,581 B2 * | 10/2005 | Fornof et al. | 95/122 |
| 7,727,313 B2 * | 6/2010 | Blackwood et al. | 96/134 |
| 7,789,950 B2 * | 9/2010 | Hoffman et al. | 96/134 |
| 2004/0163535 A1 | 8/2004 | Fornof et al. | |
| 2005/0188848 A1 | 9/2005 | Salzman et al. | |
| 2006/0123743 A1 | 6/2006 | Heer | |
| 2007/0180999 A1* | 8/2007 | Paling et al. | 96/134 |
| 2008/0307965 A1* | 12/2008 | Hoffman et al. | 95/119 |

FOREIGN PATENT DOCUMENTS

| | | | |
|---|---|---|---|
| EP | 1048541 A1 | 11/2000 | |
| GB | 2152836 A | 8/1985 | |
| JP | 60-115527 U | 8/1985 | |
| JP | 8-281031 A | 10/1996 | |
| JP | 2000-279739 A | 10/2000 | |
| JP | 2000-351363 A | 12/2000 | |
| JP | 2001-505821 A | 5/2001 | |
| JP | 2001-190923 A | 7/2001 | |
| WO | WO 2006048640 A1 * | 5/2006 | B60T 17/00 |

OTHER PUBLICATIONS

Int'l Search Report issued Feb. 9, 2010 in Int'l Application No. PCT/JP2010/050361.

Extended European Search Report issued Jun. 26, 2012 in EP Application No. 10731279.5.

* cited by examiner (a)

(b)

PRIOR ART

PRIOR ART

OIL SUPPRESSING STRUCTURE IN AIR DRYING DEVICE

CROSS-REFERENCE TO RELATED APPLICATIONS

This application is a Section 371 of International Application No. PCT/2010/050361, filed Jan. 14, 2010, which was published in the Japanese language on Jul. 22, 2010, under International Publication No. WO 2010/082610 A1 and the disclosure of which is incorporated herein by reference.

BACKGROUND OF THE INVENTION

The present invention relates generally to an oil suppressing structure in an air drying device for suppressing oil contents or oil mist contained in compressed air which rises in an interior of the air drying device of particularly a vehicle compressed air brake system for realizing an improvement in quality. The present invention relates particularly to a dehumidifying and oil adsorbing structure in an air drying device of a vehicle compressed air brake system including a polyurethane filter portion which is provided in an interior of the air drying device for suppressing oil contents or oil mist contained in compressed air for realizing an improvement in quality.

Conventionally, there is a technique disclosed in U.S. 2004/0163535A1 as a first example of an air drying device of this type for dehumidifying and removing oil from air flowing into the system. This technique, shown in FIG. 10 of the present application, will be described below. Reference numeral 1 denotes an air drying device having an outer case 2 and a base plate 3 which is fixed to a lower end 2a of the outer case 2. The base plate 3 has inlet ports 3a through which compressed air, which still contains moisture, is allowed to flow into the air drying device 1 and an outlet port 3b which is opened in a substantially central portion thereof. The base plate 3 has, for example, a circular disk shape in whole which has a predetermined thickness. A cylindrical projecting body 3c is formed at the substantially central portion of the base plate 3 and the outlet port 3b is provided to extend through the cylindrical projecting body 3c so that dried compressed air is to be discharged therethrough.

Then, the base plate 3 has eight inlet ports 3a which are formed circumferentially in an outer circumferential portion of the outlet port 3b so as to be disposed at predetermined intervals, for example, at intervals of substantially 45°. A circular disk-shaped support plate 4 in which a number of openings 4a which are made up of minute holes is disposed in a substantially central position with respect to a height direction of the outer case 2 in an interior thereof. A circular cylindrical body 5 is formed in the interior of the outer case 2 so as to project upwards from the support plate 4. In addition, a circular cylindrical spring support body 6 is formed so as to be suspended downwards from the support plate 4. An element support member 7 is disposed on an outer circumference of the cylindrical spring support body 6. Generally speaking, the element support member 7 includes a collar portion 7a at an upper end portion thereof and a cylindrical portion 7b which is integrally formed thereon so as to extend downwards, and a spring receiving seat 7c is formed at a lower portion in the interior of the cylindrical portion 7b. A circular hole 7d is opened in a substantially central portion of the spring receiving seat 7c so as to communicate with the outlet port 3b in the base plate.

Then, a spring 8 which is placed in the cylindrical portion 7b is supported at a lower end and an upper end thereof by an upper surface of the spring receiving seat 7c and the cylindrical spring support body 6, respectively. On the other hand, an element gripping portion 7e is provided circumferentially at an outer circumferential edge of the color portion 7a of the element support member 7 so as to extend downwards. An element 9 is provided at the element gripping portion 7e, and a passage 10 is formed below the element 9, a compressed air check valve 11 being provided. In addition, a desiccating agent 12 is filled in a space defined above the support plate 4 in the interior of the outer case 2.

In FIG. 10, reference character S denotes a space defined between the outer case 2 and the cylindrical portion 7b of the element support member 7.

The air drying device 1 of the first example of the related art is configured in the way described heretofore. Thus, compressed air, which still contains moisture, flowing from a compressor (not shown) flows into the air drying device 1 from the inlet ports 3a and passes through the element 9 by way of the space S, whereby oil particles and moisture contained in the compressed air are removed. Then, the compressed air flows from the openings 4a in the support plate 4 into the desiccating agent 12. The compressed air is dehumidified and dried further by the desiccating agent 12 and is then allowed to flow into the cylindrical body 5 and through the interior of the cylindrical portion 7b of the element support member 7 so as to be discharged from the outlet port 3b.

Next, there is a technique disclosed in U.S. 2006/0123743A1 as a second example of an air drying device, which is shown in FIG. 10. To describe this technique, reference numeral 1A denotes an air drying device, which has an outer case 2 and an inner case 2A. The inner case 2A is formed into a cylindrical shape, which has an upper large-diameter cylindrical body 2b and a lower small-diameter cylindrical body 2c. A multiplicity of discharge ports 2f are opened in a bottom plate 2e of the small-diameter body 2c, and the discharge ports 2f are made up of small holes which communicate with an outlet port 3b of a base plate 3. A filter plate 13 is laid over an upper surface of the bottom plate 2e. On the other hand, a first filter 14 is interposed between a lower surface of an outer circumferential edge of the bottom plate 2e and an upper surface of an outer circumferential edge of the base plate 3.

A circular cylindrical projection 2g is provided on a lower surface of a substantially central portion of the bottom plate 2e of the inner case 2A so as to project downwards therefrom. A distal end of this circular cylindrical projection 2g is fixed to an outer circumference of a cylindrical projecting body 3c formed at the substantially central portion of the base plate 3 so as to project upwards with a seal material 2h interposed between the circular cylindrical projection 2g and the cylindrical projecting body 3c. An air flowing passage S1 is formed between an outer circumferential surface of the large-diameter cylindrical body 2b and an inner wall surface of the outer case 2, and a bypass passage S2 is formed between an outer circumferential surface of the small-diameter cylindrical body 2c of the inner case 2A and the inner wall surface of the outer case 2.

Reference numeral 15 denotes a second filter, which is fixedly disposed between a lower surface of an outer circumferential edge of the large-diameter cylindrical body 2b of the inner case 2A and a lower end edge of the small-diameter cylindrical body 2c within the bypass passage S2. An exterior cover 17 including a seal member 16 provided on a lower surface is fixed to a lower portion of the base plate 3. Inlet ports 17a which communicate with inlet ports 3a of the base plate 3 and an outlet ort 17b which communicates with an outlet port 3b of the base plate 3 are formed in the exterior cover 17. In FIG. 11, reference numeral 2*d* denotes a lid plate of the inner case 2A, and a cylindrical body 2*j* is provided at a central portion of the lid plate 2*d* so as to project upwards and a number of openings 2*k*, . . . are opened in the lid plate 2*d*. A filter plate 18 is disposed on a lower surface of the lid plate 2*d*, so as to confine a desiccating agent 12 filled within the inner case 2A therein. Reference numeral 19 denotes a spring, which is placed within the cylindrical body 2*j* and is supported by an upper wall surface 2*i*.

In the figure, reference character V denotes a check valve, which is disposed in the bypass passage S2. The air drying device 1A of the second example of the related art is configured in the way described above. Thus, compressed air, which still contains moisture, flowing from a compressor (not shown) flows into the air drying device 1A from in inlet ports 3*a*, passes through the second filter 15 and the air flowing passage S1 by way of the first filter 14 and the bypass passage S2, and flows into the desiccating agent 12 by way of the openings 2*k* in the lid plate 2*d*. Then, the compressed air is dehumidified and dried further by the desiccating agent 12, flows through the discharge ports 2*f* in the base plate 2*e* by way of the filter plate 13 and is discharged from the outlet port 3*b* of the base plate 3.

When the compressor compresses outside air taken thereinto from the outside, oil mist of the compressor is mixed into compressed air. In general, in an air drying device, oil mist is removed from compressed air by a filter before water contents are removed from the compressed air. However, in the air drying devices of the first and second examples of the related art, oil mist cannot be removed sufficiently by the filter or the like, and hence, the desiccating agent is contaminated with oil mist. As a result, the drying of compressed air becomes insufficient, whereby the corrosion of various pneumatic devices and equipment installed in a vehicle including a brake system is promoted by water contents in the compressed air. In particular, there has been caused a problem that the vehicle becomes unable to run abruptly due to a failure in the brake system. In addition, in winter and cold regions, there has been caused a problem that water contents or droplets of water which enter various pneumatic devices and equipment freeze these various pneumatic devices and equipment, leading to the generation of operation failure. Further, oil from the compressor comes to stick to the filter element and the periphery thereof to thereby be accumulated and overflows from the filter element. Then, the oil flows through the desiccating agent into the various pneumatic devices and equipment so as to deteriorate rubber products such as seal materials and packings, resulting in a problem that the pneumatic devices and equipment are caused to fail by the deterioration of such rubber projects.

BRIEF SUMMARY OF THE INVENTION

An oil suppressing structure in an air drying device according to a preferred embodiment of the present invention has been invented to solve the problems described above and is established by the following configurations and means.

Namely, according to a preferred embodiment of the present invention, there is provided an oil suppressing structure in an air drying device including an outer case, a drying case which is accommodated in an interior of the outer case, which has a large-diameter long cylindrical body portion and a small-diameter long cylindrical body portion which is formed integrally with the large-diameter long cylindrical body portion and in which a desiccating agent is filled in an interior of the large-diameter long cylindrical body portion and a base plate which is fixed to a lower end of the drying case and which comprises an inlet port and an outlet port for compressed air, the oil suppressing structure characterized in that an oil adsorbing material is inserted into a space S3 defined between an inner wall surface of the outer case and the small-diameter long cylindrical body portion.

According to a preferred embodiment of the present invention, there is provided an oil suppressing structure in an air drying device including an outer case, a drying case which is accommodated in an interior of the outer case, which has a large-diameter long cylindrical body portion and a small-diameter long cylindrical body portion which is formed integrally with the large-diameter long cylindrical body portion and in which a desiccating agent is filled in an interior of the large-diameter long cylindrical body portion and a base plate which is fixed to a lower end of the drying case and which comprises an inlet port and an outlet port for compressed air, the oil suppressing structure characterized in that a single or a plurality of oil infiltration suppression plates are inserted into a space S3 defined between an inner wall surface of the outer case and the small-diameter long cylindrical body portion.

According to a preferred embodiment of the present invention, there is provided an oil suppressing structure in an air drying device including an outer case, a drying case which is accommodated in an interior of the outer case, which has a large-diameter long cylindrical body portion and a small-diameter long cylindrical body portion which is formed integrally with the large-diameter long cylindrical body portion and in which a desiccating agent is filled in an interior of the large-diameter long cylindrical body portion and a base plate which is fixed to a lower end of the drying case and which comprises an inlet port and an outlet port for compressed air, the oil suppressing structure characterized in that a single or a plurality of oil infiltration suppression plates are inserted into a vertical space S6 defined within a space S3 defined between an inner wall surface of the outer case and the small-diameter long cylindrical body portion.

The oil suppressing structure in the air drying device according to preferred embodiment of the present invention is configured in the way described above, and therefore, the following advantage are provided.

Namely, according to a preferred embodiment of the present invention, there is provided the oil suppressing structure in the air drying device including the outer case, the drying case which is accommodated in the interior of the outer case, which has the large-diameter long cylindrical body portion and the small-diameter long cylindrical body portion which is formed integrally with the large-diameter long cylindrical body portion and in which the desiccating agent is filled in the interior of the large-diameter long cylindrical body portion and the base plate which is fixed to the lower end of the drying case and which comprises the inlet port and the outlet port for compressed air, the oil suppressing structure characterized in that the oil adsorbing material is inserted into the space S3 defined between the inner wall surface of the outer case and the small-diameter long cylindrical body portion.

The oil suppressing structure is configured in the way described above, and therefore, the amount of the desiccating agent can be reduced, and the volume of the desiccating agent can be suppressed, thereby making it possible to increase the capacity of the oil trapping portion, that is, the space S3 defined between the inner wall surface of the outer case and the small-diameter long cylindrical body portion without increasing the exterior dimensions of the air drying device. Thus, oil and oil mist which flow out of the compressor to be mixed into compressed air generated by the compressor can be stored sufficiently, and the accumulation capability of oil can be increased. Thus, oil can be prevented from not only adhering to or flowing into the desiccating agent and various types of pneumatic devices and equipment but also rising, whereby not only is compressed air with a good quality allowed to flow but also the check valve and the bypass passage which are provided in the conventional oil suppressing structure can be eliminated to thereby realize a simple structure, thereby making it possible to advantageously provide the air drying device which is highly suitable for mass production.

According to a preferred embodiment of the present invention, there is provided the oil suppressing structure in the air drying device comprising the outer case, the drying case which is accommodated in the interior of the outer case, which has the large-diameter long cylindrical body portion and the small-diameter long cylindrical body portion which is formed integrally with the large-diameter long cylindrical body portion and in which the desiccating agent is filled in the interior of the large-diameter long cylindrical body portion and the base plate which is fixed to the lower end of the drying case and which comprises the inlet port and the outlet port for compressed air, the oil suppressing structure characterized in that the single or the plurality of oil infiltration suppression plates are inserted into the space S3 defined between the inner wall surface of the outer case and the small-diameter long cylindrical body portion. The oil suppressing structure is configured in the way described above, and therefore, in addition to the advantage described above, the dropping of oil and oil mist contained in compressed air can be realized with good efficiency by the oil infiltration suppression plates, thereby making it possible to advantageously realize an improvement in quality of the air drying device.

According to a preferred embodiment of the present invention, there is provided the oil suppressing structure in the air drying device comprising the outer case, the drying case which is accommodated in the interior of the outer case, which has the large-diameter long cylindrical body portion and the small-diameter long cylindrical body portion which is formed integrally with the large-diameter long cylindrical body portion and in which the desiccating agent is filled in the interior of the large-diameter long cylindrical body portion and the base plate which is fixed to the lower end of the drying case and which comprises the inlet port and the outlet port for compressed air, wherein the single or the plurality of oil infiltration suppression plates are inserted into the vertical space S6 defined within the space S3 defined between the inner wall surface of the outer case and the small-diameter long cylindrical body portion.

The oil suppressing structure in the air drying device is configured in the way described above, and therefore, when causing the compressed air to flow into the vertical space defined between the upper oil infiltration suppression plate and the lower oil infiltration suppression plate, the compressed air drastically expands to spread. Then, the compressed air so spreading can advantageously cool the interior of the vertical space, thereby making it possible to increase the quality of the air drying device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 11 is a vertical sectional view showing a second example of an air drying device of the prior at.

DETAILED DESCRIPTION OF THE INVENTION

Figure 1:
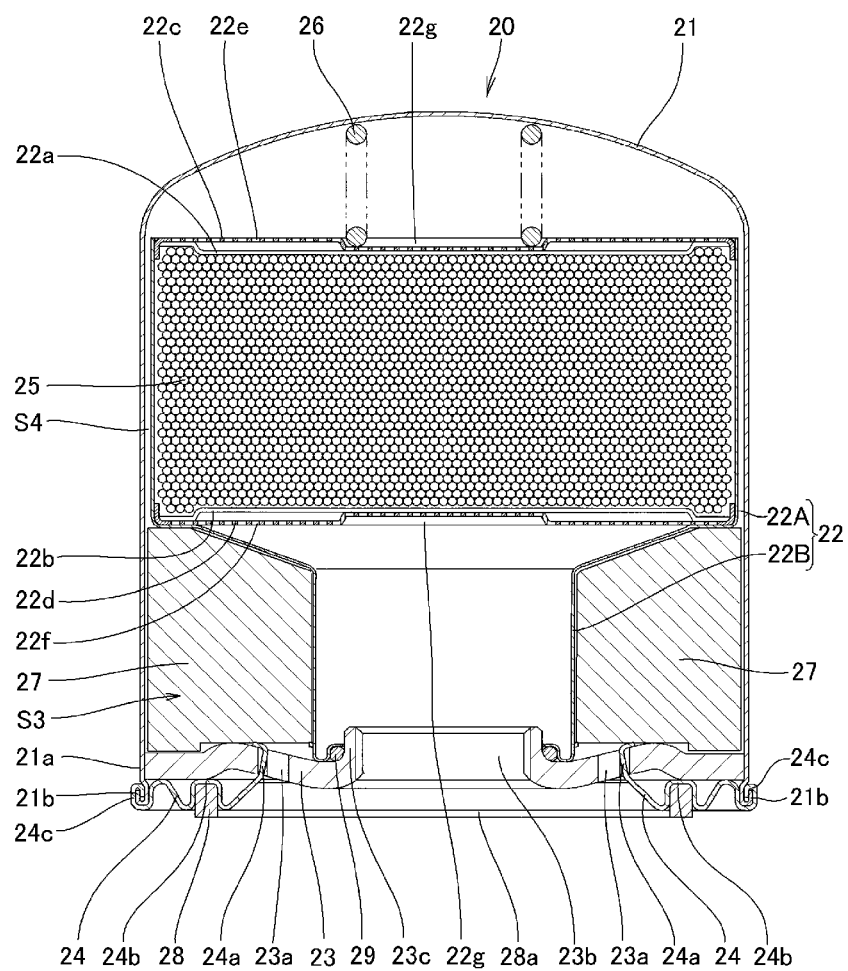
FIG. 1 is a vertical sectional view showing an oil suppressing structure in an air drying device according to a preferred embodiment of the present invention.

Certain terminology is used in the following description for convenience only and is not limiting. The words "lower," "bottom," "upper" and "front" designate directions in the drawings to which reference is made. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, a mode for carrying out an oil suppressing structure in an air drying device according to a preferred embodiment of the present invention will be described in detail based on FIG. 1.

FIG. 1 is a vertical sectional view showing an oil suppressing structure in an air drying device. Reference numeral 20 denotes an air drying device according to the invention. Broadly speaking, this air drying device 20 preferably includes an outer case 21, a drying case 22 which is accommodated in an interior of the outer case 21, a base plate 23 which is fixed to a lower end portion 21a of the outer case 21 and an outer cover 24 which supports the base plate 23 from therebelow and which is fixed to an end portion 21b of the lower end portion 21a. The outer case 21 is made of, for example, a cold-rolled steel sheet or electrolytic zinc coated steel sheet and has an overall shape which is hollow and is formed into a temple bell shape.

The drying case 22 is made of the same material as that of the outer case 21 and has a large-diameter long cylindrical body portion 22A which is formed into a substantially circular cylindrical shape as an overall shape and a small-diameter long cylindrical body portion 22B which is formed integrally with the large-diameter long cylindrical body portion 22A. A particulate desiccating agent 25 is filled in an interior of the large-diameter long cylindrical body portion 22A. The desiccating agent 25 is a high-performance desiccating agent and is made of a material such as a synthetic zeolite. Filter plates 22c, 22d are laid on or placed to cover an upper surface and a bottom surface of the large-diameter long cylindrical body portion 22A via filters 22a, 22b, respectively. The filters 22a, 22b are formed of a polyester material, for example, and have a substantially circular disk shape, whose central portion is formed lower.

The filter plates 22c, 22d are made of the same material as that of the outer case 21 and have a thin circular disk shape. A recess portion 22g is formed at a central portion of each filter plate. A support spring 26 is locked in the recess portion 22g of the upper filter plate 22c so as to support the drying case 22. In addition, the filter plates 22c, 22d each have a number of small openings 22e, 22f which are formed so as to penetrate therethrough. By adopting this configuration, compressed air which is dried flows from the small openings 22e of the filter plate 22c through the small openings 22f of the filter plate 22d by way of the filter 22a, the desiccating agent 25, flows through an interior of the small-diameter long cylindrical body portion 22B to reach an outlet port 23b of the base plate 23 and is discharged from the outlet port 23b.

Reference numeral 27 denotes an oil adsorbing material. This oil adsorbing material 27 has a substantially doughnut shape as an overall shape and is inserted to be placed in a space S3 defined between an inner wall surface of the outer case 21 and the small-diameter long cylindrical body portion 22B of the drying case 22. This oil adsorbing material 27 is a high-performance oil adsorbing material, and for example, Teijin ALTHORP (product name) can be adopted.

The base plate 23 is formed into a circular disk shape having a predetermined thickness as an overall shape. A substantially central portion of the base plate 23 is formed into a cylindrical projecting body 23c, which includes the outlet port 23b through which dried compressed air is discharged. In addition, the base plate 23 has eight inlet ports 23a which are formed circumferentially in an outer circumferential portion of the outlet port 23b at predetermined intervals, for example, at intervals of substantially 45°. Additionally, rising pieces 24a of the outer cover 24 are inserted into, for example, the eight inlet ports 23a formed in the base plate 23 to be locked on inner wall surfaces thereof. An upwardly receding groove 24b is formed circumferentially in a lower surface of the outer cover 24, and a ring-shaped seal member 28 is securely fitted in this upwardly receding groove 24b. The seal member 28 has a through hole 28a in a center portion, which communicates with the outlet port 23b of the base plate 23.

On one hand, an outer edge portion 24c of the outer cover 24 is inwardly curled. On the other hand, the end portion 21b of the lower end portion 21a of the outer case 21 is curled outwardly. Then, for example, a seal agent is applied between the curled portions of the outer case 21 and the outer cover 24 and the curled portions are crimped together fixedly.

In the figures, reference numeral 29 denotes a seal member, which is interposed between a lower end edge of the small-diameter long cylindrical body portion 22B of the drying case 22 and an outer circumferential surface of the cylindrical projecting body 23c of the base plate 23, whereby a high closing capability is ensured therebetween.

Next, the operation of the mode for carrying out the air drying device according to a preferred embodiment of the present invention will be described. The air drying device 20 is configured as has been described heretofore, and therefore, compressed air, which contains moisture, flowing from a compressor (not shown) flows into the air drying device 20 from the inlet ports 23a to flow through the oil adsorbing material 27 within the space S3 to thereby remove various types of oil particles such as heavy oil, crude oil, machine oil, coal oil and gas oil and moisture contents which are contained in the compressed air. The oil adsorbing material 27 increases a capability to accumulate oil contained in compressed air, and compared with the related art, approximately 30% of the whole of oil particles and oil mist contained in compressed air caused to flow therethrough can be removed.

In this case, compressed air in which so-called oil infiltration is prevented by the action of the oil adsorbing material 27 is caused to flow into the desiccating agent 25. Namely, dried air sent out of the oil adsorbing material 27 flows to the desiccating agent 25 through the small openings 22e of the filter plate 22c by way of a gap S4 defined between the outer case 21 and the large-diameter long cylindrical body portion 22A. The compressed air is further dehumidified to be dried and is caused to flow out into the small-diameter long cylindrical body portion 22B of the drying case 22 and is then discharged from the outlet port 23b in the base plate 23. Then, no oil contents remain in the compressed air caused to flow out into a tank disposed below the seal member 28, thereby making it possible to increase the quality of the air drying device. Here, a total surface area of the inlet ports 23a of the base plate and a sectional area at right angles to an axis of the gap S4 defined between the outer case 21 and the large-diameter long cylindrical body portion 22A of the drying case 22 may be made almost the same. Then, a sectional area at right angles to an axis of the small-diameter long cylindrical body portion 22B of the drying case 22 and a sectional area at right angles to an axis of the outlet port 23b of the base plate may be made almost the same. In addition, a sectional area at right angles to an axis of the space S3 defined between the inner wall surface of the outer case 21 and the small-diameter long cylindrical body portion 22B of the drying case 22 may be made larger than a sectional area at right angles to an axis of the small-diameter long cylindrical body portion 22B of the drying case 22. Further, the inlet ports 23a of the base plate may be disposed as close to a center side of the base plate 23 as possible with respect to the gap S4. By adopting this arrangement, the flow rate within the space S3 becomes slow, and oil mist becomes easy to be formed into droplets of liquid (be condensed).

In addition, when an oil adsorbing material 27 of a so-called cartridge type is used, the oil adsorbing material 27 does not have to be wasted after use but can be washed for reuse within the space S3. In addition, the used oil adsorbing material 27 can be replaced with a fresh oil adsorbing material 27.

Preferred Embodiment

Figure 2:
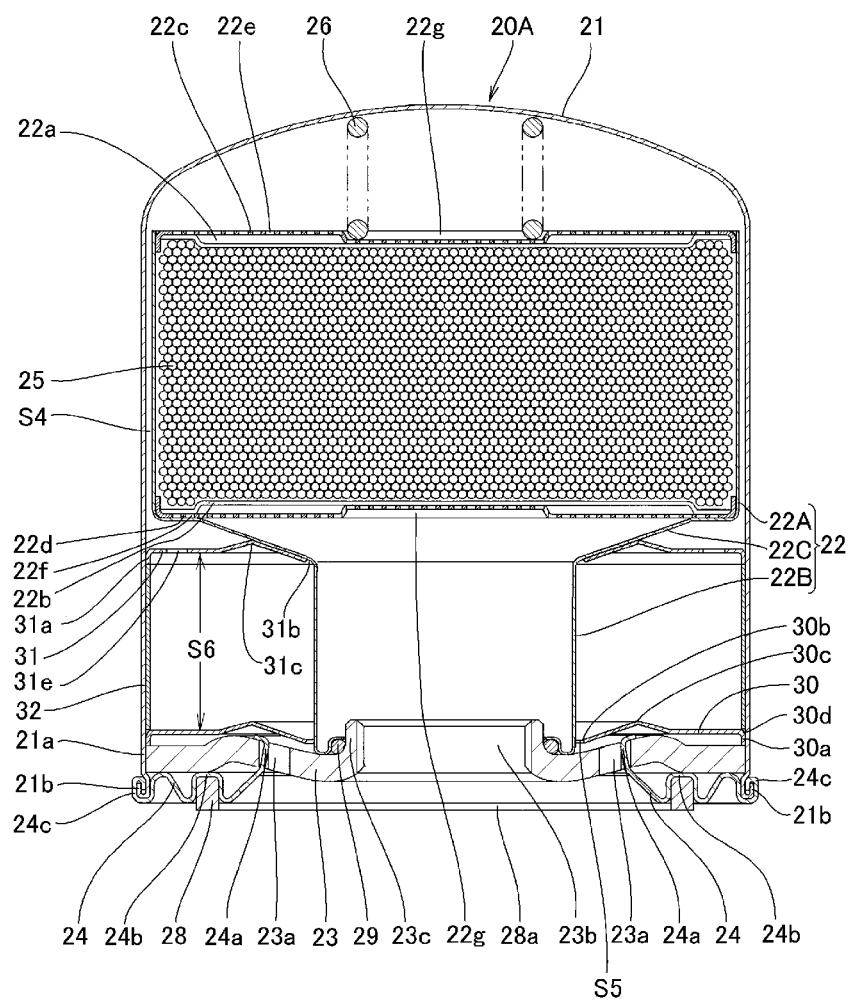
FIG. 2 is a vertical sectional view showing an oil suppressing structure in an air drying device according to a preferred embodiment of the present invention.

Next, a preferred embodiment of an air drying device according to the present invention will be described in detail based on FIG. 2. FIG. 2 is a vertical sectional view showing another example of an oil suppressing structure in an air drying device according to a preferred embodiment of the present invention.

In a configuration according to the present embodiment, the oil adsorbing material 27 which is provided in the mode for carrying out the oil suppressing structure in the air drying device according to the invention described above is eliminated, while an oil rising suppression plate, which will be described in detail later, is used in place of the oil adsorbing material 27. A single or a plurality of oil suppression plates are disposed within the space S3 shown in FIG. 1. Specifically speaking, for example, an oil rising suppression plate 30 is fixedly disposed in a lower position of the space S3, and an oil rising suppression plate 31 is fixedly disposed above the oil rising suppression plate 30. Then, oil particles and oil mist contained in compressed air flowing from the compressor is removed by the oil rising suppressions 30, 31.

The lower oil rising suppression plate 30 is made of, for example, a cold-rolled steel sheet or electrolytic zinc plated steel sheet and has a thin doughnut shape as an overall shape. In addition, an annular bent portion 30a is formed along an outer circumferential edge of the oil infiltration suppression plate 30. An outside diameter length of the bent portion 30a is substantially the same as an inside diameter length of the outer case 21, and the bent portion 30a is in close contact with an inner wall surface of an outer case 21 along the full circumference thereof. The oil infiltration suppression plate 30 has a through hole 30b in a center thereof, and a diametric length of the through hole 30b is slightly larger than an outside diameter length of a small-diameter long cylindrical body portion 22B of a drying case 22. Therefore, a space S5 is defined between the small-diameter long cylindrical body portion 22B of the drying case 22 and an inner surface of the through hole 30b. A moderate angular ridge 30c is formed concentrically with the through hole 30b on an upper surface of the oil infiltration suppression plate 30 in an intermediate position between an outer circumferential edge and the through hole 30b as is shown in FIG. 2.

The upper oil infiltration suppression plate 31 is formed of the same material as that of the lower oil infiltration suppression plate 30 and has the same shape as that of the lower oil infiltration suppression plate 30. Consequently, the upper and lower oil infiltration suppression plates 30, 31 can be used commonly. The oil infiltration suppression plate 30 and the oil infiltration suppression plate 31 differ from each other in that a plurality of, or, for example, eight through holes 31e are opened circumferentially at equal intervals in an outer circumferential portion of an angular ridge 31c in the upper oil infiltration suppression plate 31. In addition, an annular bent portion 31a formed along an outer circumferential edge of the upper oil infiltration suppression plate 31 is in close contact with the inner wall surface of the outer case 21 along the full circumference thereof, and the small-diameter long cylindrical body portion 22B of the drying case 22 is disposed so as to pass through a through hole 31b in the upper oil infiltration suppression plate 31. In addition, an inclined surface on one side of an upper surface of the angular ridge 31c is in close contact with an inclined surface 22C of the drying case 22. A sectional area at right angles to an axis of the space S5 and a total sectional area at right angles to an axis of the through hole 31b may be made almost the same.

A sleeve 32 is made of, for example, a cold-rolled steel sheet or electrolytic zinc plated steel sheet and has a thin cylindrical body as an overall shape. An outer wall surface of the sleeve 32 is disposed so as to be in close contact with the inner wall surface of the outer case 21. A lower end face of the sleeve 32 is in abutment with a shoulder portion 30d of the annular bent portion 30a of the lower oil infiltration suppression plate 30 along the full circumference thereof. In addition, a lower end of the bent portion 30a is disposed so as to be in press contact with an upper surface of a circumferential edge of the base plate 23. An upper end face of the sleeve 32 is in abutment with a lower end face of an annular bent portion 31a of the upper oil infiltration suppression plate 31 along the full circumference thereof.

In FIG. 2, the sleeve 32 does not necessarily have to be provided, and in this preferred embodiment, the sleeve 32 may be omitted.

In addition, in the preferred embodiment, the two oil infiltration suppression plates 30, 31 are provided. However, only one oil infiltration suppression plate may be provided in either the upper position or the lower position in the space S3, or a plurality of oil infiltration suppression plates (or a plurality of sets of oil infiltration suppression plates) may be provided. In any case, oil infiltration suppression plates may be provided so as to match the design specification of the air drying device 20.

Next, the operation of the preferred embodiment of the air drying device according to the present invention, in particular, the oil infiltration suppression plates thereof will be described.

The air drying device 20A is configured as is described above, and therefore, compressed air, which contains moisture, flowing from a compressor (not shown) flows into the air drying device 20A from the inlet ports 23a and comes into collision with a lower surface of the angular ridge 30c of the lower oil infiltration suppression plate 30. As this occurs, oil particles and oil mist contained in the compressed air are heavier in weight than the compressed air as a gas, and therefore, oil particles and oil mist do not flow through the surface of the lower surface of the angular ridge 30c but stick to and stay on the lower surface of the angular ridge 30c when they collide against the lower surface of the angular ridge 30c.

As a result of oil particles and oil mist sticking to the lower surface of the angular ridge 30c, the compressed air whose contents of oil particles and oil mist are reduced flows through the space S5 defined between the inner surface of the through hole 30b of the oil infiltration suppression plate 30 and the small-diameter circular cylindrical body portion 22B of the drying case 22 to thereby flow into the sleeve 32. Here, the compressed air is sent into a vertical space S6 defined between the upper oil infiltration suppression plate 31 and the lower oil infiltration suppression plate 30. As this occurs, the compressed air drastically expands and spreads. Then, the compressed air cools the inside of the vertical space S6, increasing the quality of the air drying device 20A. Further, the compressed air rises within the vertical space S6 to thereby come into collision with a lower surface of the oil infiltration suppression plate 31. As this occurs, most of the oil particles and oil mist contained in the compressed air sticks to and stays on a lower surface of the angular ridge 31c.

Note that an oil adsorbing agent may be disposed within the vertical space S6.

Then, the compressed air from which oil particles and oil mist are removed, that is, the compressed air in which oil is prevented from rising flows through a through hole 31e in the oil infiltration suppression plate 31 so as to flow into a desiccating agent 25 through small openings 22e formed in a filter plate 22c by way of the space defined between the outer case 21 and the large-diameter circular cylindrical body portion 22A. The compressed air is further dehumidified and dried and is then sent to the cylindrical body 22B so as to be discharged from the outlet port 23b of the base plate 23.

Residuals such as oil particles and oil mist which stick to and stay on the angular ridge 30c and the angular ridge 31c drop on to the inner surface of the base plate 3 for accumulation. The air drying device is configured in the way described above, and therefore, the volume of the desiccating agent can be suppressed, thereby making it possible to increase the capacity of the space S3 defined between the inner wall surface of the outer case 21 and the small-diameter circular cylindrical body portion 22B of the drying case 22 without increasing the exterior dimensions of the air drying device. Thus, oil and oil mist which flow out of the compressor to be mixed into compressed air generated by the compressor can be stored sufficiently, and oil can be prevented from not only adhering to or flowing into the desiccating agent and various types of pneumatic devices and equipment, thereby making it possible to obtain dried air with good quality.

The other configurations and operation of the oil suppressing structure according to the preferred embodiment in the air drying device according to the present invention are substantially the same as those of the mode shown in FIG. 1, and hence, the description thereof will be omitted here.

Next, a preferred embodiment of a dehumidifying and oil adsorbing structure in an air drying device according to the present invention will be described in detail based on FIG. 3.

Figure 3:
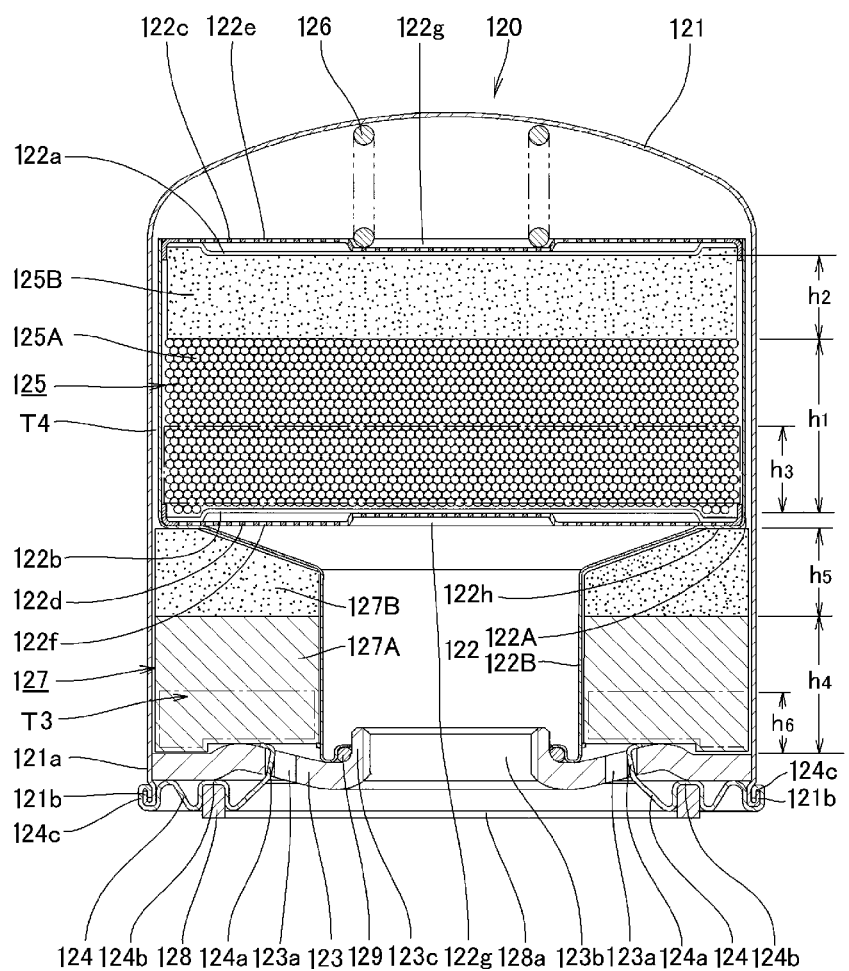
FIG. 3 is a vertical sectional view showing a dehumidifying and oil adsorbing structure in an air drying device according to a preferred embodiment of the present invention.

FIG. 3 is a vertical sectional view showing a dehumidifying and oil adsorbing structure in an air drying device. Reference numeral 120 denotes an air drying device according to a preferred embodiment of the present invention. This air drying device 120 includes broadly an outer case 121, a drying case 122 which is accommodated in an interior of the outer case 121, a base plate 123 fixed to a lower end portion 121a of the outer case 121 and an outer cover 124 which supports the base plate 123 from therebelow and which is fixed to an end portion 121b of the lower end portion 121a. The outer case 121 is made of, for example, a cold-rolled steel sheet or electrolytic zinc plated steel sheet and has a hollow temple bell shape as an overall shape.

The drying case 122 is made of the same material as that of the outer case 121 and has a substantially cylindrical shape as an overall shape. The drying case 122 has a large-diameter long cylindrical body portion 122A and a small-diameter long cylindrical body portion 122B which is formed integrally with the large-diameter long cylindrical body portion 122A. A dehumidifying member 125 is filled in an interior of the large-diameter long cylindrical body portion 122A. As is shown in FIG. 3, the dehumidifying member 125 includes a desiccating agent portion 125A and a filter portion 125B formed of a polyurethane material which is disposed on an upper surface portion of the desiccating agent portion 125A. The desiccating agent portion 125A is disposed from an inner bottom surface of the large-diameter long cylindrical body portion 122A, that is, a filter plate 122d to a position at a height h1. Then, the filter portion 125B is disposed from a ceiling surface of the large-diameter long cylindrical body portion 122A, that is, a filter plate 122a to a position at a height h2.

Here, a total value of the height h1 and the height h2 is almost equal to the height of the large-diameter long cylindrical body portion 122A. Both the desiccating agent portion 125A and the filter portion 125B have a cylindrical shape so that they can properly fit in an interior of the large-diameter long cylindrical body portion 122A. As a disposition example of the dehumidifying member 125, as has been described above, the desiccating agent portion 125A is disposed at a lower portion of the large-diameter long cylindrical body portion 122A and the filter portion 125B is disposed at an upper portion thereof. However, the invention is not limited thereto, and a configuration may be adopted in which the filter portion 125B is disposed at the lower portion of the large-diameter long cylindrical body portion 122A in a position at a height h3 from the filter plate 122d as is indicated by alternate long and short dash lines and the desiccating agent portion 125A is disposed thereabove.

The desiccating agent 125A is a high-performance desiccating agent and is made up of, for example, a synthetic zeolite, silica gel or active alumina solely or in combination thereof. Filter plates 122c, 122d are laid on or placed to cover an upper surface and a bottom surface of the large-diameter long cylindrical body portion 122A via filters 122a, 122b, respectively. The filters 122a, 122b are formed of a polyester material, for example, and have a substantially circular disk shape, whose central portion is formed lower.

The filter plates 122c, 122d are made of the same material as that of the outer case 121 and have a thin circular disk shape. A recess portion 122g is formed at a central portion of each filter plate. A support spring 126 is locked in the recess portion 122g of the upper filter plate 122c so as to support the drying case 122. In addition, the filter plates 122c, 122d each have a number of small openings 122e, 122f which are formed so as to penetrate therethrough. By adopting this configuration, compressed air which is dried flows from the small openings 122e of the filter plate 122c through the small openings 122f of the filter plate 122d by way of the filter 122a, the desiccating agent 125, flows through an interior of the small-diameter long cylindrical body portion 122B to reach an outlet port 123b of the base plate 123 and is discharged from the outlet port 123b.

Reference numeral 127 denotes an oil filter and has a substantially doughnut shape as an overall shape. The oil filter 127 includes a filter portion 127A made of a solidified aluminum foil and a filter portion 127B made of polyurethane which is disposed on the solidified aluminum foil filter portion 127A. The polyurethane filter portion 127B constitutes an oil contents adsorbing filter made of polyurethane or the like. As a material for the oil contents adsorbing filter which is made of polyurethane, a polyester-based foamed polyurethane or Moltopren is preferable, and a formed polyether-based foamed polyurethane is particularly preferable. The oil filter 127 is inserted to be placed in a space T3 defined between the inner wall surface of the outer case 121 and the small-diameter long cylindrical body portion 122B of the drying case 122. In addition, the solidified aluminum foil filter portion 127A is disposed so as to extend as high as a position at a height h4 from an upper surface of the base plate 123. Then, the polyurethane filter portion 127B is disposed on an upper surface of the solidified aluminum foil filter portion 127A so as to extend as high as a position at a height h5 from a ceiling surface 122h of the small-diameter long cylindrical body portion 122B.

Here, a total value of the height h4 and the height h5 substantially equals the height of the small-diameter long cylindrical body portion 122B. Both the solidified aluminum foil filter portion 127A and the polyurethane filter portion 127B have a substantially doughnut shape. As a disposition example of the oil filter 127, as has been described above, the solidified aluminum foil filter portion 127A is disposed at the lower portion of the small-diameter long cylindrical body portion 122B and the polyurethane filter portion 127B is disposed at the upper portion of the small-diameter long cylindrical body portion 122B. However, the invention is not limited thereto, and a configuration may be adopted in which the polyurethane filter portion 127B is disposed below the solidified aluminum foil filter portion 127A in a position at a height h6 from the upper surface of the base plate 123 as is indicated by alternate long and short dash lines.

The base plate 123 is formed into a circular disk shape having a predetermined thickness as an overall shape. A substantially central portion of the base plate 123 is formed into a cylindrical projecting body 123c, which includes the outlet port 123b through which dried compressed air is discharged. In addition, the base plate 123 has eight inlet ports 123a which are formed circumferentially in an outer circumferential portion of the outlet port 123b at predetermined intervals, for example, at intervals of substantially 45°. Additionally, rising pieces 124a of the outer cover 124 are inserted into, for example, the eight inlet ports 123a formed in the base plate 123 to be locked on inner wall surfaces thereof. An upwardly receding groove 124b is formed circumferentially in a lower surface of the outer cover 124, and a ring-shaped seal member 128 is securely fitted in this upwardly receding groove 124b. The seal member 128 has a through hole 128a in a center portion, which communicates with the outlet port 123b of the base plate 123.

On one hand, an outer edge portion 124c of the outer cover 124 is inwardly curled. On the other hand, the end portion 121b of the lower end portion 121a of the outer case 121 is curled outwardly. Then, for example, a seal agent is applied between the curled portions of the outer case 21 and the outer cover 24 and the curled portions are crimped together fixedly.

In the figure, reference numeral 129 denotes a seal member, which is interposed between a lower end edge of the small-diameter long cylindrical body portion 122B of the drying case 122 and an outer circumferential surface of the cylindrical projecting body 123c of the base plate 123, whereby a high closing capability is ensured therebetween.

A method of fabricating the polyurethane filter portion 127B of the oil filter 127 which is applied to a preferred embodiment of the present invention will be described based on FIGS. 4(a)-4(c).

Figure 4:
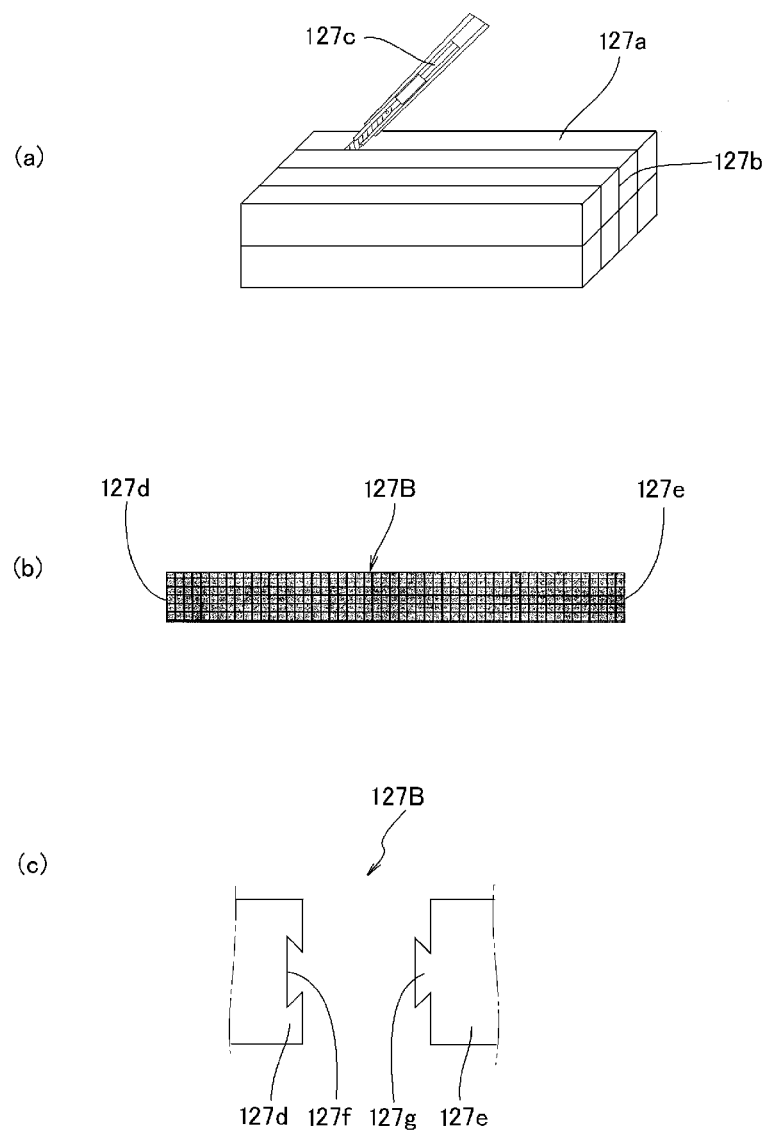
FIG. 4 shows a fabrication method of a polyurethane filter portion which is applied to the dehumidifying and oil adsorbing structure in the air drying device according to a preferred embodiment of the present invention, of which a perspective view of a polyurethane material is shown in FIG. 4(a), a front view of a belt-shaped urethane member after the polyurethane material is cut is shown in FIG. 4(b), and a side view showing shapes of one end and the other end of the belt-shaped urethane member is shown in FIG. 4(c)
Figure 5:
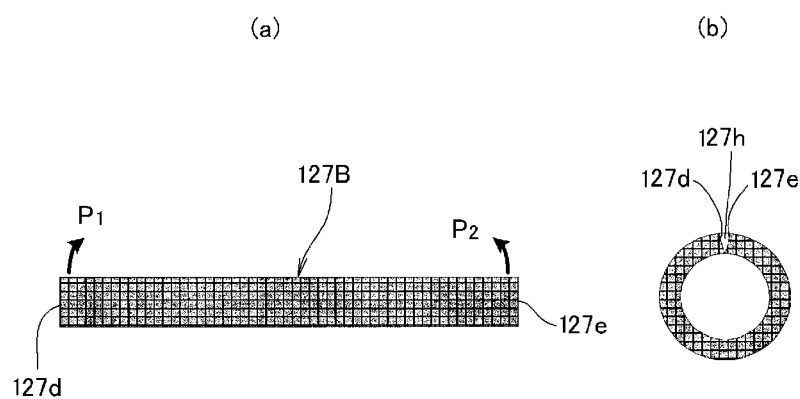
FIG. 5 shows a state in which a belt-shaped urethane member (a polyurethane filter portion) which is applied to the invention is bent into a curled shape, of which a front view is shown in FIG. 5(a) and a plan view of the belt-shaped urethane member resulting after it is bent into the curled shape is shown in FIG. 5(b)

FIG. 4(a) is a perspective view showing a polyurethane material 127a, and the polyurethane material 127a has a large, substantially rectangular parallelepiped shape. As is shown as an example, lines are drawn on the polyurethane material 127a so as to be applied to the invention, and the polyurethane material 127a is cut into a rectangular parallelepiped belt-like shapes as is shown in FIG. 4(b) with a tool or a cutting device such as a cutting tool 127c based on the lines so drawn. A belt-shaped urethane member so fabricated constitutes the polyurethane filter portion 127B. Then, as is shown in FIG. 4(c), a receding groove 127f and a projection 127g are formed at vertically central portions of one end 127d and the other end 127e, respectively, of the belt-shaped urethane member (the polyurethane filter portion) 127B. Thus, when the belt-shaped urethane member (the polyurethane filter portion) 127B is disposed in the space T3 shown in FIG. 3, the receding groove 127f and the projection 127g are fitted together. By adopting this configuration, the assembling properties of the belt-shaped urethane member (the polyurethane filter portion) 127B are increased. In addition, the receding groove 127f and the projection 127g do not have to be formed at both the ends of the belt-shaped urethane member (the polyurethane filter portion) 127B. Instead, as is shown in FIG. 5(a), the belt-shaped urethane member 127B may be bent in directions indicated by arrows P1, P2 into a curled shape so as to be then disposed in the space T3 in such a state that a gap 127h is kept between the ends of the belt-shaped urethane member 127B as is shown in FIG. 5(b) which is a plan view of the belt-shaped urethane member 127 shown in FIG. 5(a) which is curled.

Figure 6:
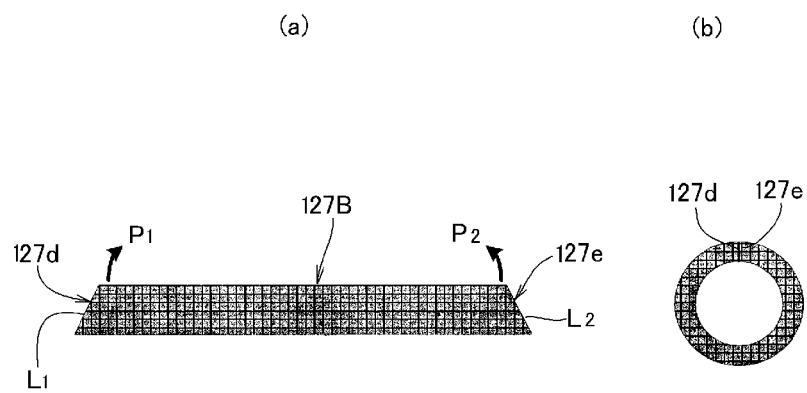
FIG. 6 shows a state in which a belt-shaped urethane member (a polyurethane filter portion) of another example which is applied to a preferred embodiment of the present invention is bent into a curled shape, of which a front view is shown in FIG. 6(a) and a plan view of the belt-shaped urethane member resulting after it is bent into the curled shape is shown in FIG. 6(b)

Further, the receding groove 127f and the projection 127g do not have to be formed at both ends of a belt-shaped urethane member (a polyurethane filter portion) 127B. Instead, as is shown in FIG. 6(a), inclined surfaces L1, L2 having an appropriate angle may be formed and the belt-shaped urethane member 127B may be bent in directions indicated by arrows P1, P2 into a curled shape so that the inclined surfaces L1, L2 are brought into abutment with each other as is shown in FIG. 6(b) which is a plan view of the belt-shaped urethane member 127B in FIG. 6(a) which is curled. By adopting this configuration, one end 127d and the other end 127e of the belt-shaped urethane member (the polyurethane filter portion) 127B are closely attached and joined together, thereby the close attaching properties of the belt shaped urethane member (the polyurethane filter portion) 127B being increased.

Figure 7:
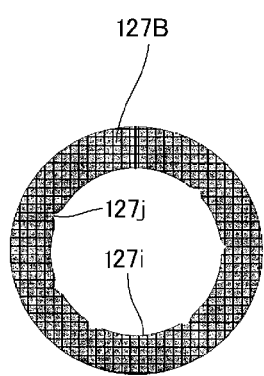
FIG. 7 shows a state in which notches are provided in an inner surface of a belt-shaped urethane member which is applied to a preferred embodiment of the present invention, of which a side view is shown in FIG. 7(a) and a partially enlarged view showing a portion of the belt-shaped urethane member where notches are provided is shown in FIG. 7(b)
Figure 7:
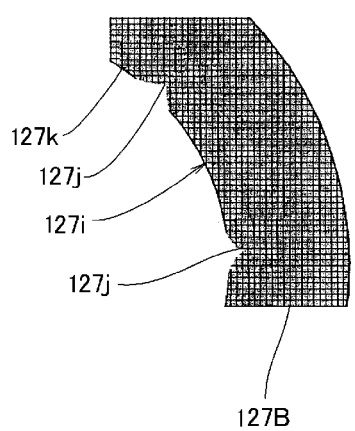

In addition, as is shown in FIG. 7(a), a plurality of notches 127j are formed at predetermined intervals on an inside surface of a belt-shaped urethane member (a polyurethane filter portion) 127B, and one end 127d and the other end 127e are bent into a curled shape. As this occurs, the bending work can be performed smoothly without any stress generated in the inside surface 127i of the belt-shaped urethane member (the polyurethane filter portion) 127B. When the belt-shaped urethane member (the polyurethane filter portion) 127B which is completed is disposed within the space T3, a peripheral portion 127k of the notch 127j is closely attached to an external surface of the small-diameter long cylindrical body portion 122B so as to increase the close attaching properties.

Next, the operation of the preferred embodiment of the dehumidifying and adsorbing structure of the air drying device according to the present invention will be described based on FIG. 3.

The air drying device 120 is configured in the way described above, and therefore, compressed air, which contains moisture, flowing from a compressor (not shown) flows into the air drying device 120 from the inlet ports 123a to flow through the solidified aluminum foil filter portion 127A and the polyurethane filter portion 127B of the oil filter 127 within the space T3 to thereby remove various types of oil particles such as heavy oil, crude oil, machine oil, coal oil and gas oil and moisture contents which are contained in the compressed air. As this occurs, the oil filter 127 includes the solidified aluminum foil filter portion 127A and the polyurethane filter portion 127B, and therefore, oil contents contained in the compressed air can be trapped and removed in a repeated fashion. Consequently, the oil filter 127 increases a capability to trap and accumulate oil contained in compressed air, and compared with the related art, approximately 50% of the whole of oil particles and oil mist contained in compressed air caused to flow therethrough can be removed.

In this case, compressed air in which so-called oil infiltration is prevented by the action of the oil filter 127, that is, the solidified aluminum foil filter portion 127A and the polyurethane filter portion 127B is caused to flow into the dehumidifying member 125. Namely, dried air sent out of the oil filter 127 flows to the dehumidifying member 125 through the small openings 122e of the filter plate 122c by way of a gap T4 defined between the outer case 121 and the large-diameter long cylindrical body portion 122A. Here, the dehumidifying member 125 is made up of the desiccating agent portion 125A and the filter portion 125B formed of the polyurethane material, and therefore, the dehumidifying member 125 is inexpensive and light in weight, having an extremely high function to dehumidify compressed air. In particular, the dehumidifying member 125 can dehumidify or remove moisture contents of compressed air which is sent thereinto through the gap T4 and which is almost free from oil contained, whereby the air drying device is allowed to operate smoothly and extremely efficiently.

The compressed air which is dehumidified and dried is caused to flow out into the small-diameter long cylindrical body portion 122B of the drying case 122 and is then discharged from the outlet port 123b in the base plate 123. Consequently, no oil contents remain in the compress air caused to flow out into a tank disposed downstream of the seal member 128, thereby making it possible to increase the quality of the air drying device. Here, a total surface area of the inlet ports 123a of the base plate and a sectional area at right angles to an axis of the gap T4 defined between the outer case 121 and the large-diameter long cylindrical body portion 122A of the drying case 122 may be made almost the same. Then, a sectional area at right angles to an axis of the small-diameter long cylindrical body portion 122B of the drying case 122 and a sectional area at right angles to an axis of the outlet port 123b of the base plate may be made almost the same. Further, the total surface area of the inlet ports 123a of the base plate and the sectional area at right angles to the axis of the outlet port 123b of the base plate may be made almost the same. In addition, a sectional area at right angles to an axis of the space T3 defined between the inner wall surface of the outer case 121 and the small-diameter long cylindrical body portion 122B of the drying case 122 may be made larger than a sectional area at right angles to an axis of the small-diameter long cylindrical body portion 122B of the drying case 122. Further, the inlet ports 23a of the base plate may be disposed as close to a center side of the base plate 123 as possible with respect to the gap T4. By adopting this arrangement, the flow rate within the space T3 becomes slow, and oil mist becomes easy to be formed into droplets of liquid (be condensed).

In addition, when an oil filter 127 of a so-called cartridge type is used, the oil filter 127 does not have to be wasted after use but can be washed for reuse within the space T3. In addition, the used oil filter 127 can be replaced with a fresh oil filter 127.

Preferred Embodiment 1

Figure 8:
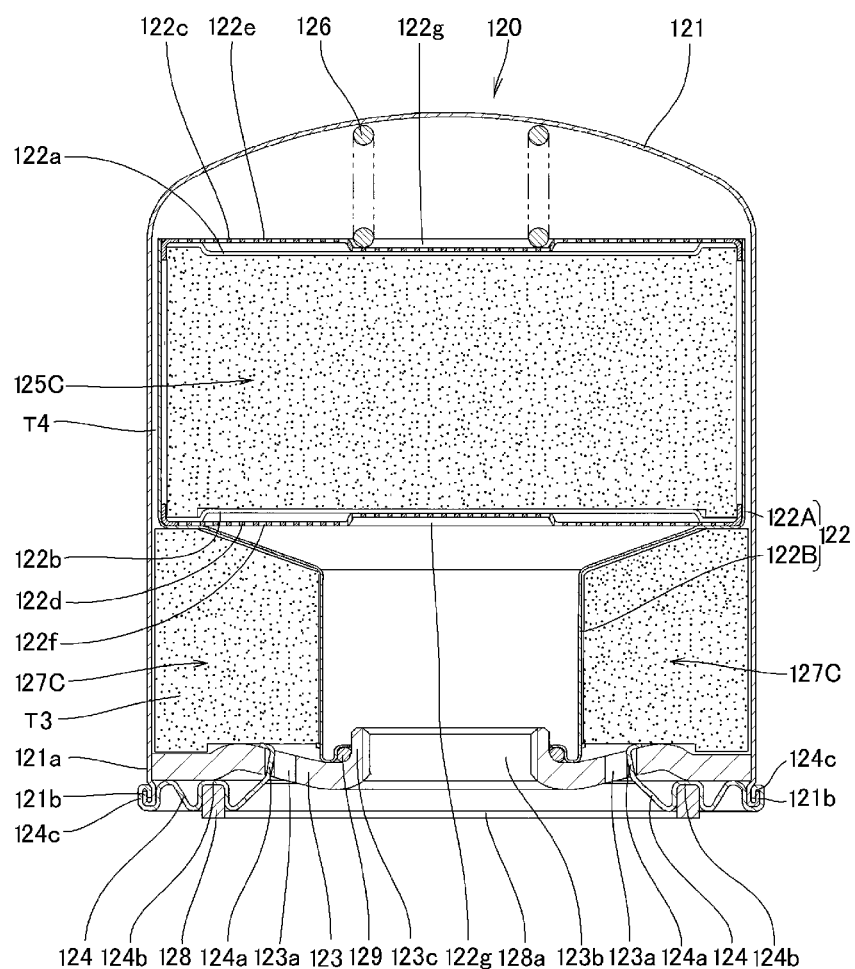
FIG. 8 is a vertical sectional view showing examples of a dehumidifying member and an oil filter which are applied to Preferred Embodiment 1 of a dehumidifying and oil adsorbing structure in a drying device according to a preferred embodiment of the present invention.

Next, Preferred Embodiment 1 of a dehumidifying and oil adsorbing structure in an air drying device according to the present invention will be described in detail based on FIG. 8. FIG. 8 is a vertical sectional view showing examples of a dehumidifying member 125C and a polyurethane filter 127C which are applied to an air drying device according to a preferred embodiment of the present invention.

In Preferred Embodiment 1, the drying case 122 is made of the same material as that of the outer case 121 and has a substantially cylindrical shape as an overall shape. The drying case 122 has a large-diameter long cylindrical body portion 122A and a small-diameter long cylindrical body portion 122B which is formed integrally with the large-diameter long cylindrical body portion 122A. A dehumidifying member 125C is filled in the whole area of an interior of the large-diameter long cylindrical body portion 122A. The dehumidifying member 125C is made up of, for example, a synthetic zeolite, silica gel or active alumina solely or in combination thereof and is disposed or filled from an inner bottom plate of the large-diameter cylindrical body portion 122A, that is, a filter plate 122d to a filter plate 122c, or to the height of the large-diameter long cylindrical body portion 122A having a generally circular cylindrical shape or to the position of a ceiling surface thereof.

Filter plates 122c, 122d are laid on or placed to cover an upper surface and a bottom surface of the large-diameter long cylindrical body portion 122A via filters 122a, 122b, respectively. The filters 122a, 122b are formed of a polyester material, for example, and have a substantially circular disk shape, whose central portion is formed lower.

Next, reference numeral 127C denotes a polyurethane filter which has a substantially doughnut shape as an overall shape. The polyurethane filter 127C is inserted to be placed in the whole area of a space T3 defined between an inner wall surface of the outer case and a small-diameter long cylindrical body portion 122B of the drying case 122. In addition, the polyurethane filter 127C is inserted to be placed in the whole area of the small-diameter long cylindrical body portion 122B from a ceiling surface 122h to an upper surface of a base plate 123. The polyurethane filter 127C has a substantially doughnut shape.

Next, the operation of Preferred Embodiment 1 of the dehumidifying and oil adsorbing structure of the air drying device according to the present invention will be described.

The air drying device 120 is configured in the way described above, and therefore, compressed air, which contains moisture, flowing from a compressor (not shown) flows into the air drying device 120 from inlet ports 123a to flow through the polyurethane filter 127C within the space T3 to thereby remove various types of oil particles such as heavy oil, crude oil, machine oil, coal oil and gas oil and moisture contents which are contained in the compressed air. As this occurs, since the oil filter is made of the polyurethane oil filter 127C, oil contents contained in the compressed air can be trapped and removed. Consequently, the polyurethane oil filter 127C is light in weight and inexpensive and increases a capability to trap and accumulate oil contained in compressed air, and compared with the related art, approximately 50% of the whole of oil particles and oil mist contained in compressed air caused to flow therethrough can be removed.

In this case, compressed air in which so-called oil infiltration is prevented by the action of the polyurethane oil filter 127C is caused to flow into the dehumidifying member 125C. Namely, dried air sent out of the polyurethane oil filter 127C flows to the dehumidifying member 125C through small openings 122e of the filter plate 122c by way of a gap T4 defined between the outer case 121 and the large-diameter long cylindrical body portion 122A. Here, the dehumidifying member 125C is made up of a synthetic zeolite, silica gel or active alumina solely or in combination thereof, having an extremely high function to dehumidify compressed air. In particular, the dehumidifying member 125C can dehumidify or remove moisture contents of compressed air which is sent thereinto through the gap T4 by way of the polyurethane filter 127C, whereby the air drying device is allowed to operate smoothly and extremely efficiently.

The compressed air is dehumidified and dried further and is caused to flow out into the small-diameter long cylindrical body portion 122B of the drying case 122, then being discharged from the outlet port 123b in the base plate 123. Consequently, no oil contents remain in the compress air caused to flow out into a tank disposed downstream of the seal member 128, thereby making it possible to increase the quality of the air drying device. The other configurations and operation of the dehumidifying and oil adsorbing structure of the air drying device according to Preferred Embodiment 1 are substantially the same as those of the air drying device shown in FIG. 3, and like reference numerals and reference characters are given to like portions, and the description thereof will be omitted. Consequently, the polyurethane filer 127C may be inserted to be placed partially in the space T3, provided that the same filter can cover all the section at right angles to an axis of the flow path in the space T3.

Preferred Embodiment 2

Next, Preferred Embodiment 2 of a dehumidifying and oil adsorbing structure in an air drying device according to the present invention will be described in detail based on FIG. 9.

Figure 9:
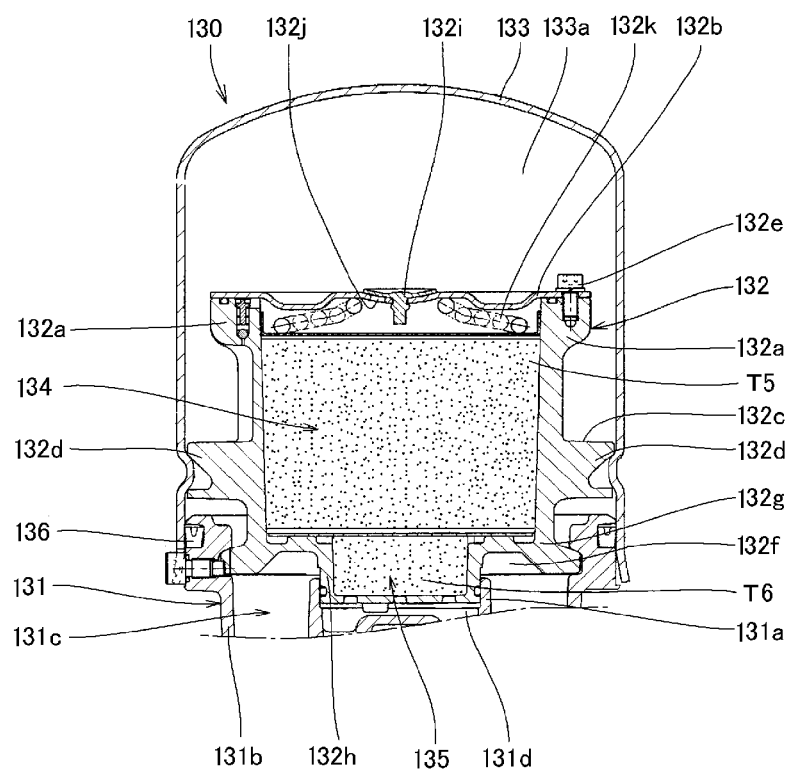
FIG. 9 is a vertical sectional view showing examples of a dehumidifying member and an oil filter which are applied to Preferred Embodiment 2 of a dehumidifying and oil adsorbing structure in a drying device according to a preferred embodiment of the present invention.
Figure 10:
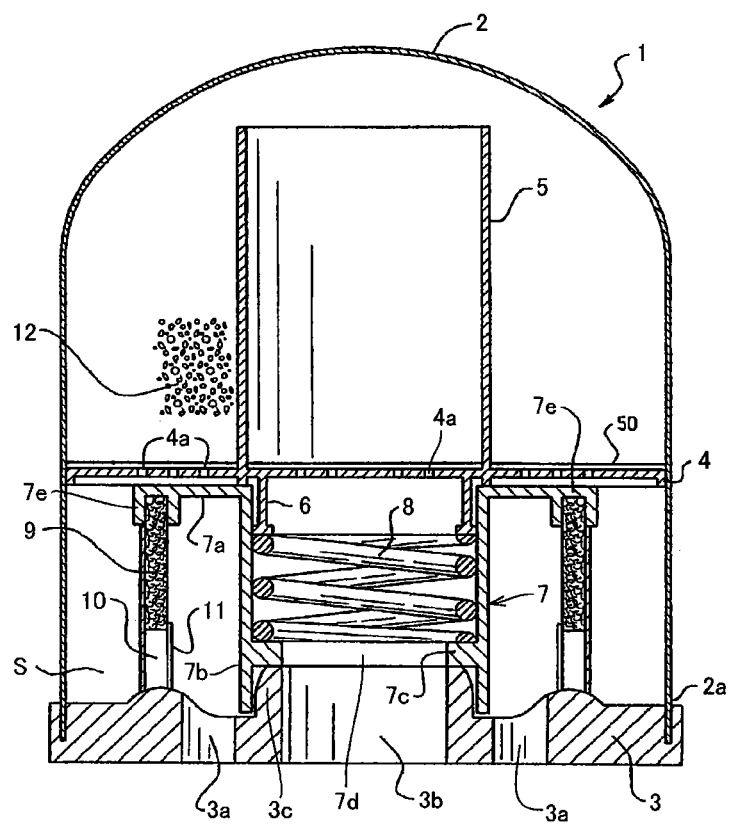
FIG. 10 is a vertical sectional view showing a first example of an air drying device of the prior art.
Figure 11:
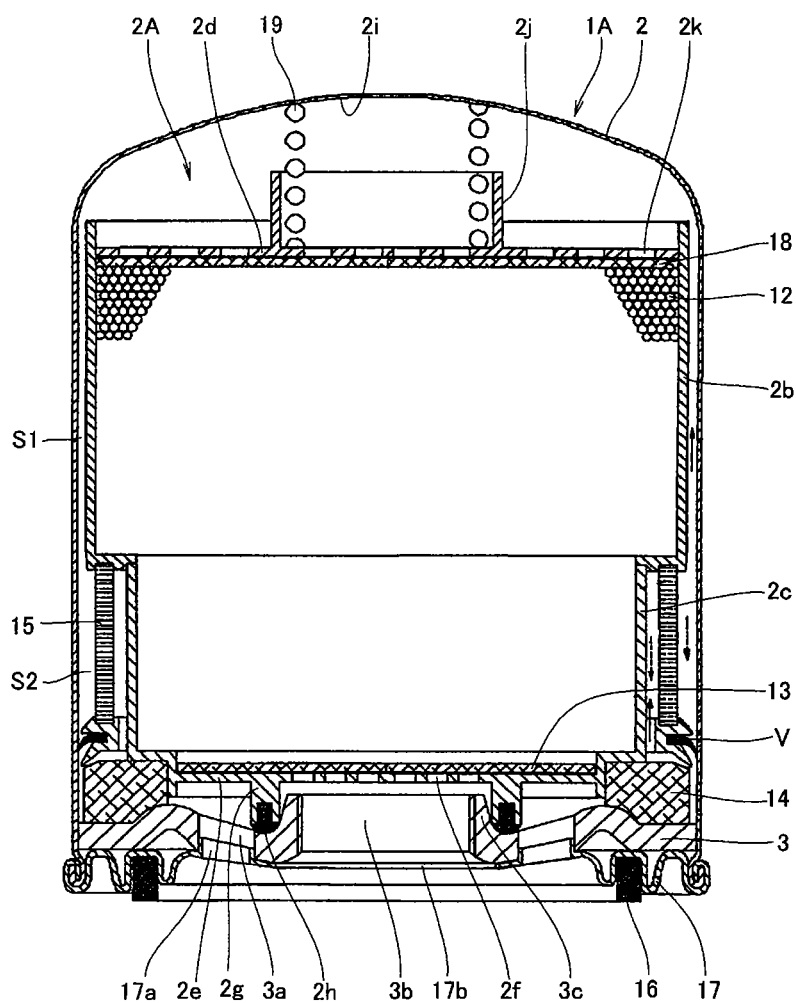

FIG. 9 is a vertical sectional view showing an example of an arrangement of a dehumidifying member which is made up of a synthetic zeolite, silica gel or active alumina solely or in combination thereof and a polyurethane filter which are applied to a purge tank-integrated air drying device according to a preferred embodiment of the present invention.

A thick support base 131 exists at a bottom portion of a compressed air drying device 130. The support base 131 is a metal molded product of aluminum or an alloy thereof. An inlet port (not shown) which communicates with a discharge port of an air compressor (not shown) is provided in one side surface of the support base 131, and an outlet port (not shown) which communicates with a tank (not shown) is provided in the other side surface thereof.

The inlet port communicating with the discharge port of the air compressor (not shown) extends from an inlet bore extending in a radial direction to a central vertical bore 131d and communicates with an upper surface of the support base 131. The support base 131 has a drain valve unit and includes concentrically an inner ring portion 131a and an outer ring portion 131b on an upper surface side. The outer ring portion 131b is made higher and thicker than the inner ring portion 131a. The upper surface of the support base 131 is largely scooped continuously between the inner ring portion 131a and the outer ring portion 131b, whereby a ring-shaped space 131c is formed thereat. This ring-shaped space 131c is made use of as a space for storing compressed air which has been subjected to the desiccating operation. Consequently, a valve accommodation hole accommodating a check valve is opened to the ring-shaped space 131c.

In addition to the support base 131, the compressed air drying device 130 includes a desiccating container 132 which is positioned above the support base 131 and a purge tank 133 which functions as an outer cover. The desiccating container 132 is a container which accommodates a dehumidifying member 134 in the whole area of an interior space T5. In addition, the purge tank 133 is a cover which encapsulates an outer periphery of the desiccating container 132 so as to define a first compartment 33a for storage of compressed air between the desiccating container 132 and itself. The purge tank 133 and the desiccating container 132 are fitted together. A seal ring 136 is provided at the portion where they are fitted together so as to ensure a tight closure. In addition, projecting portions are formed along an upper end circumferential edge of the desiccating container 132 so as to project radially therefrom. A predetermined number of, for example, eight projecting portions 132a are provided circumferentially. Then, a lid member 132b is fixed to upper surfaces of the projecting portions 132a with mounting bolts 132e. In addition, a predetermined number of purge tank locking receding grooves 132c are provided circumferentially at a lower portion of the desiccating container 132. These purge tank locking receding grooves 132c are brought into engagement with a predetermined number of locking projections 132d which are formed at a lower portion of the purge tank 133 to thereby lock the purge tank 133.

A large-diameter lower portion 132g of the desiccating container 132 includes a ring-shaped interior space 132f. The ring-shaped interior space 132f defines a second compartment for storage of compressed air which has been subjected to the desiccating operation together with a support base 131 side ring-shaped space 131c. The second compartment for storage of compressed air, that is, the ring-shaped space 131c and the first compartment 133a for storage of compressed air are caused to communicate with each other through a plurality of communication holes (not shown).

The ring-shaped interior space 132f in the large-diameter lower portion 132g is made up of a wider portion and a narrower portion which are continuous with each other. To match this configuration, in the interior of the desiccating container 132, an accommodation portion T6 with a small capacity is provided in a bottom portion 132h, and an accommodation portion with a large capacity, that is, an interior space T5 is provided thereabove. A polyurethane filter 135 is filled or accommodated in the whole area of the accommodation portion T6 with the small capacity in the bottom portion 132h so as to be placed therein. A dehumidifying member 134 is filled or accommodated in the whole area of the interior space T5 which lies above the accommodation portion T6 with the small capacity. The polyurethane filter 135 and the dehumidifying member 134 which are placed in the interior of the container can be replaced by removing a lid member 132b at an upper portion of the desiccating container 132 by untightening a plurality of mounting bolts 132e. A relatively large passage 132j is defined in the lid member 132b, which passage 132j is closed by a check valve 132i. In addition, a coil spring 132k is placed underneath the lid member 132b so as to control the filling of the dehumidifying member 134 in an appropriate fashion.

Next, the operation of Preferred Embodiment 2 of the dehumidifying and oil adsorbing structure of the air drying device according to the present invention will be described.

Compressed air to be subjected to a desiccating operation flows into the polyurethane filter 135 from the inlet port where compressor oil and dust are removed. Following this, the compressed air passes through the dehumidifying member 134 where the compressed air is dehumidified by the dehumidifying member 134 with good efficiency. The compressed air which has been dehumidified to now be dry opens the check valve 132i and flows into the first compartment 133a which stores compressed air of the purge tank 133 from the passage 132j and then into the second compartment or the ring-shaped space 131c which communicates with the first compartment 133a and stores compressed air. Part of the compressed air that has flowed thereinto is stored within the first compartment 133a and the ring-shaped space 131c for reproduction and the remaining of the compressed air flows out from the check valve within the support base 131 into an exterior main tank for storage therein.

As this occurs, in the compressed air drying device 133, compressed air, which contains moisture, flows from the inlet port into and passes through the polyurethane filter portion 135 in the accommodation portion T6 with the small capacity in the bottom portion 132h of the desiccating container 32 where various types of oil particles such as heavy oil, crude oil, machine oil, coal oil and gas oil and moisture contents which are contained in the compressed air are removed. As this occurs, since the oil filter is made up of the polyurethane filter portion 135, compared with a case where only an aluminum foil filter is used, oil contents contained in the compressed air can be trapped and removed with good efficiency by the polyurethane filter 135 which is light in weight and inexpensive. Consequently, the polyurethane filter 135, which is light in weight and inexpensive, can increase the capability to trap and accumulate oil contained in compressed air. In addition, compressed air is dehumidified with good efficiency by the dehumidifying member 134. Thus, compared with the related art, approximately 50% of the whole of oil particles and oil mist contained in compressed air can be removed.

A preferred embodiment of the present invention is to be used in a field of an automotive compressed air supply system, and an objective thereof is not only to dehumidify and clean compressed air which flows into the compressed air drying device but also to cause to oil to fall in the form of oil droplets by providing the oil adsorbing material which can adsorb oil and the oil infiltration suppression plates.

In addition, an objective of a preferred embodiment of the present invention is to remove oil contents and moisture contents by the dehumidifying member and the polyurethane filter.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An oil suppressing structure in an air drying device comprising:
   an outer case;
   a drying case in an interior of the outer case and having a large-diameter long cylindrical body portion and a small-diameter long cylindrical body portion integrally formed with the large-diameter long cylindrical body portion, a desiccating agent being filled in an interior of the large-diameter long cylindrical body portion; and
   a base plate fixed to a lower end of the drying case and comprising an inlet port and an outlet port for compressed air,
   wherein an oil adsorbing material is inserted into a space defined between an inner wall surface of the outer case, the small-diameter long cylindrical body portion and the base plate, the space in which the oil adsorbing material is provided having a radial cross-sectional area larger than a radial cross-sectional area of the small-diameter long cylindrical body portion.

2. An oil suppressing structure in an air drying device comprising:
   an outer case;
   a drying case in an interior of the outer case and having a large-diameter long cylindrical body portion and a small-diameter long cylindrical body portion integrally formed with the large-diameter long cylindrical body portion, a desiccating agent is filled in an interior of the large-diameter long cylindrical body portion;
   a base plate fixed to a lower end of the drying case and comprising an inlet port and an outlet port for compressed air;
   a lower oil infiltration suppression plate fixedly disposed in a lower position of a space defined between an inner wall surface of the outer case and the small-diameter long cylindrical body portion;
   an upper oil infiltration suppression plate fixedly disposed in the space above the lower oil infiltration suppression plate;
   a vertical space defined between the upper oil infiltration suppression plate and the lower oil infiltration suppression plate; and
   an oil adsorbing material disposed in the vertical space.

3. An oil suppressing structure in an air drying device comprising:
   an outer case;
   a drying case in an interior of the outer case and having a large-diameter long cylindrical body portion and a small-diameter long cylindrical body portion integrally formed with the large-diameter long cylindrical body portion, a desiccating agent is filled in an interior of the large-diameter long cylindrical body portion;
   a base plate fixed to a lower end of the drying case and comprising an inlet port and an outlet port for compressed air;
   an upper oil infiltration suppression plate and a lower oil infiltration suppression plate located adjacent opposing ends of the small-diameter long cylindrical body portion and inserted into a space defined between an inner wall surface of the outer case and the small-diameter long cylindrical body portion, wherein the upper oil infiltration suppression plate includes a first through hole around an outer, circumferential portion thereof, and the lower oil infiltration suppression plate includes an approximately central second through hole, defined by a gap between a periphery of the lower oil infiltration suppression plate and the small-diameter long cylindrical body portion; and
   a vertical space defined between the upper oil infiltration suppression plate and the lower oil infiltration suppression plate, the vertical space defining a volume adapted to permit air flow through the second through hole to drastically expand and spread into the volume of the vertical space, thereby cooling the vertical space.

* * * * *